United States Patent [19]

Allan et al.

[11] Patent Number: 4,534,851

[45] Date of Patent: Aug. 13, 1985

[54] FEED INJECTION METHOD TO PREVENT COKING ON THE WALLS OF TRANSFER LINE REACTORS

[75] Inventors: David E. Allan; Charles H. Martinez, both of Baton Rouge, La.

[73] Assignee: Exxon Research and Engineering Co., Florham Park, N.J.

[21] Appl. No.: 500,408

[22] Filed: Jun. 2, 1983

[51] Int. Cl.³ .......................... C10G 9/12; C10G 9/16
[52] U.S. Cl. .............................. 208/48 R; 208/127; 208/130; 208/131; 208/153
[58] Field of Search .................. 208/48 R, 153, 127, 208/113, 130, 489, 131

[56] References Cited

U.S. PATENT DOCUMENTS

| | | | |
|---|---|---|---|
| 2,937,988 | 5/1960 | Polack | 208/127 |
| 2,952,619 | 9/1960 | Metrailer et al. | 208/127 |
| 2,953,517 | 9/1960 | Whiteley et al. | 208/127 |
| 3,071,540 | 11/1963 | McMahon et al. | 208/48 R |
| 3,152,065 | 10/1964 | Sharp et al. | 208/157 |
| 3,246,960 | 4/1966 | Sharp et al. | 208/153 |
| 3,671,424 | 6/1972 | Saxton | 208/127 |
| 3,674,679 | 7/1972 | Washimi et al. | 208/48 R |
| 4,097,366 | 6/1978 | Tanaka et al. | 208/48 R |
| 4,263,128 | 4/1981 | Bartholic | 208/91 |

FOREIGN PATENT DOCUMENTS 23406 7/1973 Japan.

Primary Examiner—D. E. Gantz
Assistant Examiner—Chung K. Pak
Attorney, Agent, or Firm—Marthe L. Gibbons

[57] ABSTRACT

A hydrocarbon feed injection method is provided in which concentric inlet conduits carry hydrocarbon liquid and steam. Small nozzles located on the outer steam-carrying conduit discharge steam in the direction of the inner wall of the transfer line reactor to protect the inner wall from carbonaceous deposits. The hydrocarbon feed nozzles are staged along a line parallel to the longitudinal axis of the transfer line.

6 Claims, 2 Drawing Figures

FEED INJECTION METHOD TO PREVENT COKING ON THE WALLS OF TRANSFER LINE REACTORS

BACKGROUND OF THE INVENTION

1. Field of the Invention

The present invention relates to a method of introducing a hydrocarbonaceous feed into a transfer line reactor.

2. Description of the Prior Art

It is known to introduce a hydrocarbonaceous feed into a transfer line reaction zone operated at conditions at which at least a portion of the hydrocarbonaceous feed cracks, thereby producing a carbonaceous material (coke) which may deposit on the inner wall of the transfer line reactor. The term "transfer line reactor" is used herein to mean an elongated conduit type reaction zone having a high length to diameter ratio. The transfer line zone may be a zone in which it is desired to conduct a substantial amount of cracking or the transfer line zone may be a feed line into a reactor where only a portion of conversion of the feed occurs due to the temperature and pressure conditions of the transfer line zone. For example, fluid coking may be conducted in a transfer line, as shown in U.S. Pat. No. 3,671,424. Catalytic conversion of hydrocarbonaceous oil may also be carried out in a transfer line reactor. It is also known to decarbonize heavy hydrocarbonaceous oils in a transfer line, e.g., a rising confined vertical column, as shown in U.S. Pat. No. 4,263,128.

A problem in transfer line processes operated at conditions where the hydrocarbons may crack, is the production of carbonaceous materials, a substantial amount of which may deposit on the inner wall of the transfer line.

U.S. Pat. No. 2,937,988 discloses a method and apparatus for preventing coking on the walls of a transfer line reactor. A distributor deflects a flowing solids stream against the inner wall of the reactor to shield the inner wall of the reactor and protect the wall from carbonaceous deposits.

U.S. Pat. No. 3,152,065 discloses a method of injecting hydrocarbon feed in a catalytic transfer line reaction zone in which the hydrocarbon feed inlet conduits are horizontally spaced. The steam inlets are positioned in the feed conduit.

A feed and steam injection method has now been found in which a portion of the steam accompanying the feed is deflected towards the inner wall of the transfer line conduit so as to provide a protective steam cover which will minimize or prevent coke from depositing on the inner wall.

SUMMARY OF THE INVENTION

In accordance with the invention there is provided, a method of introducing a hydrocarbonaceous liquid feed into a transfer line reaction zone which comprises: introducing said hydrocarbonaceous liquid feed and steam into said transfer line reaction zone as separate concentric streams, said hydrocarbonaceous feed being the inner stream and said steam being the circumferential stream, discharging a first portion of said steam as a stream directed towards an inner wall of said transfer line reaction zone, and discharging said hydrocarbonaceous liquid and a second portion of said steam in a direction parallel to the longitudinal axis of said transfer line reaction zone.

DESCRIPTION OF THE PREFERRED EMBODIMENT

Figure 1:
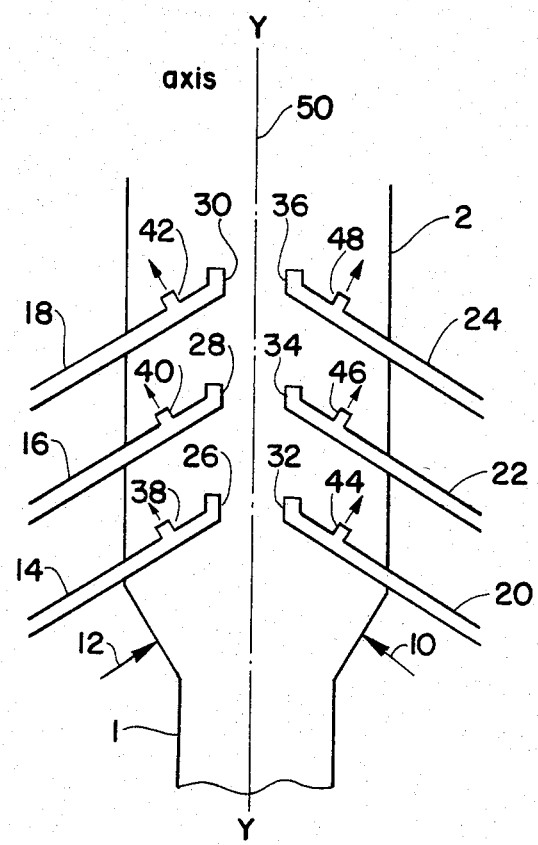
FIG. 1 is a schematic plan of one embodiment of the invention.
Figure 2:
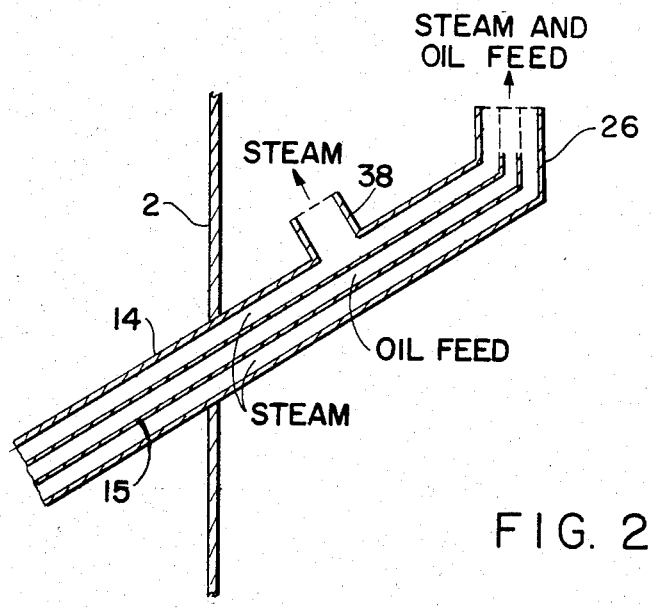
FIG. 2 is a sectional view of the feed and steam injection means.

Referring to FIG. 1, fluidized solids are introduced by riser 1 into transfer line reactor 2. The solids may be inert solids, such as coke, or may be catalytic solids or mixtures thereof. Steam is introduced into the bottom portion of transfer line reactor 2 by inlets 10 and 12 to maintain the solids as a suspension flowing upwardly in transfer line reactor 2. Suitable length to the diameter ratios for transfer line reactor 2 range from about 20 to about 40. Inlet conduits 14, 16, 18, 20, 22 and 24 are disposed as three pairs of conduits which enter through the vertical wall of transfer line reactor 2 and are disposed in a vertically staged manner so that the conduits terminate parallel to the longitudinal axis of transfer line reactor 2 and are at a spaced vertical distance from each other. FIG. 2 shows a sectional view of inlet conduit 14. Referring to FIG. 2, it can be seen that within inlet conduit 14 is disposed in concentric relation smaller diameter inlet conduit 15. A liquid hydrocarbonaceous feed is introduced into the inner smaller conduit 15. The hydrocarbonaceous feed may be any hydrocarbonaceous oil in liquid phase suitable for the specific process to be conducted in the transfer line reactor. Steam is introduced into the annulus formed by the outer wall of inner conduit 15 and the inner wall of conduit 14. The steam surrounds the inner conduit circumferentially. This steam acts as insulator to prevent or minimize coking inside the feed nozzle. Conduit 14 has a gas outlet nozzle 38 disposed in a diagonal direction set at an angle such that steam will emerge from nozzle 38 and be directed towards the inner wall of transfer line reactor 2, thereby forming a layer of steam that will cover at least a portion of the inner wall. The steam cover will shield the inner wall of the transfer line reactor from carbonaceous deposits which result from cracking of the hydrocarbon feed. Concentric conduits 15 and 14 terminate in outlet nozzle 26 disposed vertically and upwardly so that the hydrocarbon liquid and the remaining portion of the steam emanate as an upwardly directed stream. Although no detail is shown on the nozzle tip, there are various well-known designs that permit the steam to provide good feed atomization. The hydrocarbon liquid may mix with the steam at the exit of the nozzle or the tip of the nozzle or the inner conduits may be shorter than the outer conduit so that the liquid and steam may mix before exiting from nozzle 26. Preferably, the transfer line reactor comprises more than one pair of concentric inlet conduits disposed in spaced relation parallel to the longitudinal axis of transfer line reactor so as to stage the introduction of the hydrocarbonaceous feed into the transfer line reactor. Returning to FIG. 1, conduits 16, 18, 20, 22 and 24 are each comprised of a smaller inner concentric conduit and similar nozzle systems as the ones described for conduit 14. Although six pairs of inlet conduits are shown in FIG. 1, the number of pairs of inlet conduits is not critical and they may be more or less inlet conduits disposed around the circumference of the transfer line reactor. Gas outlet nozzles 38, 40, 42, 44, 46 and 48 are each disposed in a diagonal direction set at an angle such that steam will emerge from the nozzles and be directed towards the inner wall of transfer line reactor 1. Nozzles 26, 28, 30, 32, 34 and 36 are disposed vertically and upwardly parallel to the longitudinal axis of transfer line reactor 2 so that the liquid hydrocarbons and a portion of the steam emanate as an upwardly directed stream. the atomized hydrocarbonaceous feed, upon contact with the upflowing fluidized solids which are generally hot, will be vaporized. The suspension of solids and vaporized hydrocarbon flows out of transfer line reactor 2 as shown at 50. The suspension may be introduced into a dense fluidized bed of inert solids or catalytic solids for additional conversion of the hydrocarbons or the suspension may be separated in a gas-solid separation zone in a conventional way.

The feed injection method of the present invention is suitable for use in a fluid coking process, in a catalytic cracking process, or in any process wherein carbon or coke is formed in a transfer line by desired or undesired cracking of a hydrocarbonaceous feed.

Transfer line coking conditions vary widely and depend on the feed used and the desired amount of conversion. Any known transfer line coking conditions and feed may be used in the transfer line of the present invention, with or without added catalyst.

Transfer line catalytic conversions of hydrocarbonaceous feeds such as catalytic cracking are also well known. Any known transfer line catalytic conversion conditions and feeds may be used in the transfer line of the present invention. The method of the present invention may also be used in transfer line processes to decarbonize and/or demetallize heavy hydrocarbonaceous oils in the presence of inert solids.

What is claimed is:

1. A method of introducing a hydrocarbonaceous liquid feed into a transfer line reaction zone, which comprises:

introducing said hydrocarbonaceous liquid feed and steam into said transfer line reaction zone as separate concentric streams, said hydrocarbonaceous feed being introduced into a conduit disposed in inner concentric relation to an outer conduit, and said steam being introduced into said outer conduit, discharging a first portion of said steam as a stream directed towards an inner wall of said transfer line reaction zone through a nozzle positioned on said outer conduit to cover at least a portion of said inner wall of said transfer line reaction zone with said first portion of steam, and discharging said hydrocarbonaceous liquid feed and a second portion of said steam in a direction parallel to the longitudinal axis of said transfer line reaction zone through outlets comprised by said outer conduit and said inner conduit.

2. The method of claim 1 wherein said hydrocarbon liquid feed is introduced into said transfer line reaction zone as at least two separate streams disposed at a spaced distance along a longitudinal axis of said transfer line reaction zone, each of said streams being surrounded by a concentric stream of steam.

3. The method of claim 1 wherein said liquid hydrocarbon feed is introduced into said transfer line reaction zone as a plurality of streams disposed at a spaced distance parallel to the longitudinal axis of said transfer line reaction zone, each of said streams being surrounded by a circumferential stream of steam.

4. The method of claim 3 wherein said hydrocarbonaceous streams are disposed along more than one parallel line to the longitudinal axis of said transfer line reaction zone.

5. The method of claim 1 wherein said transfer line reaction zone is vertically disposed, and wherein said hydrocarbonaceous feed is introduced into said transfer line in a plurality of vertically staged streams, each of said streams being in inner concentric relation to a stream of steam, said hydrocarbonaceous streams being discharged vertically and upwardly and at least a portion of each of said steam streams being discharged diagonally at an angle such that said steam stream portions are deflected towards the inner wall of said transfer line reaction zone to cover at least a portion of said inner wall with steam.

6. The method of claim 1 wherein fluidized solids are present in said transfer line reaction zone and wherein the suspension of said solids in hydrocarbons is removed from said transfer line reaction zone.

* * * * *